United States Patent Office

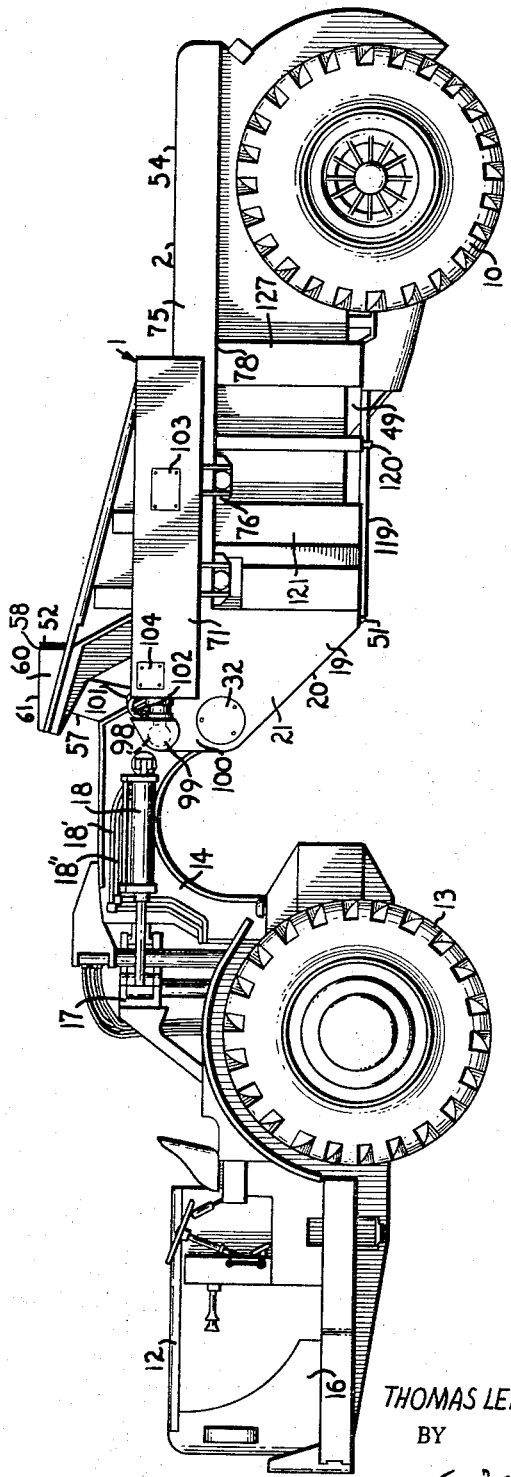

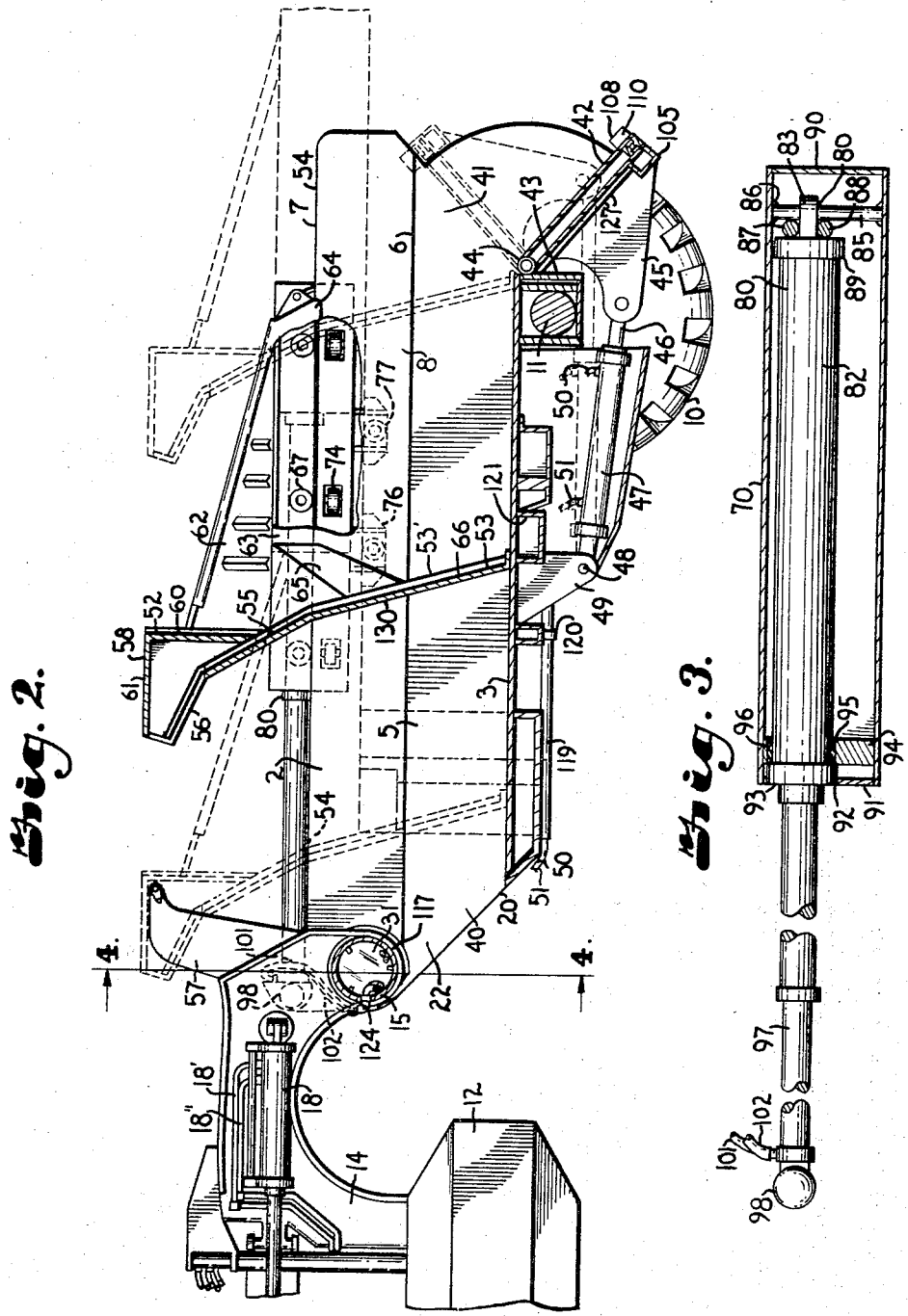

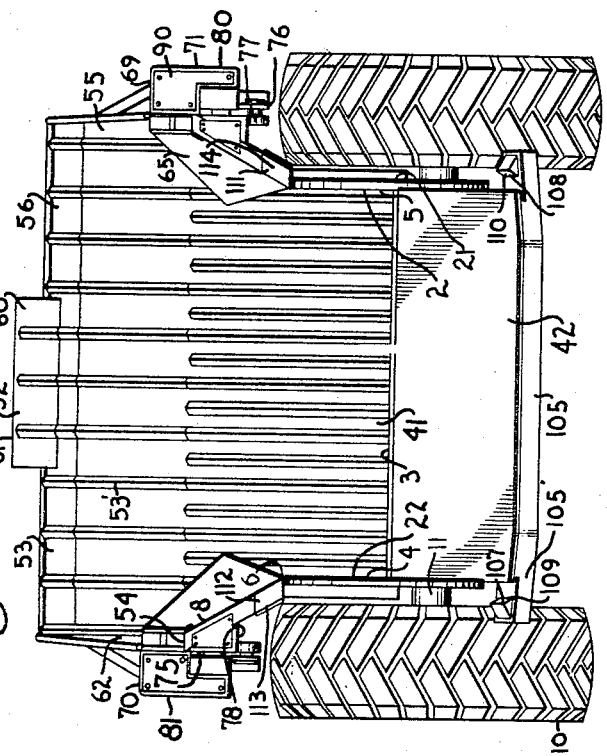
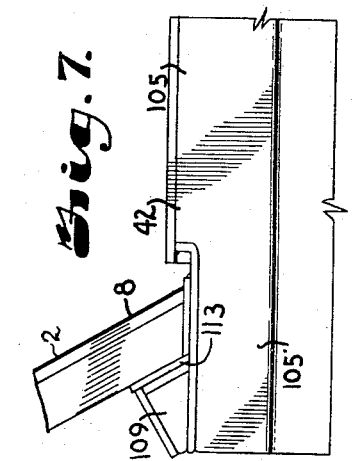
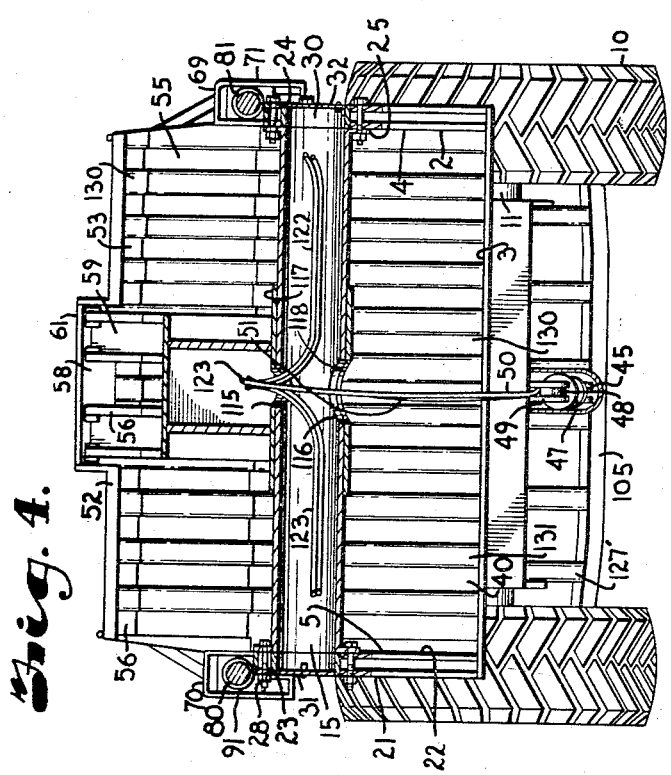
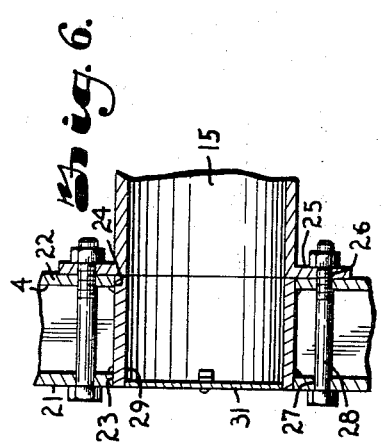
INVENTOR.
THOMAS LEE RICHARD HARDWICK
BY
ATTORNEYS

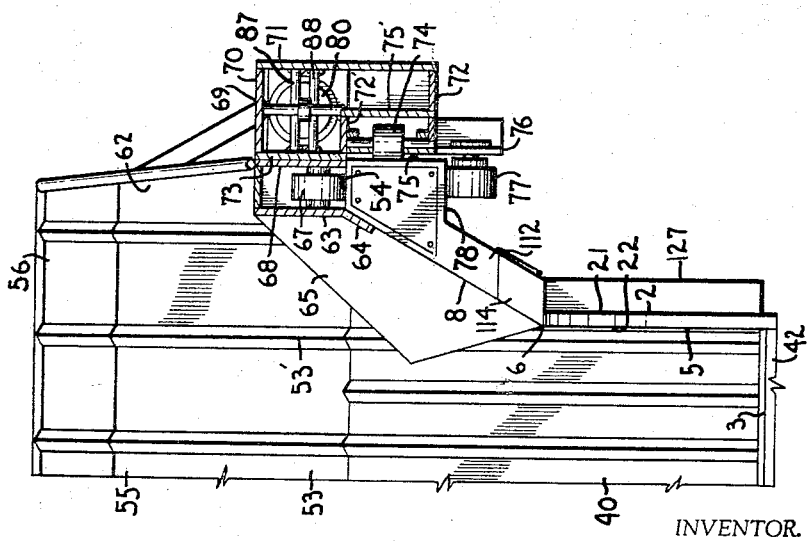

3,352,439
Patented Nov. 14, 1967

3,352,439
EJECTOR TYPE LOAD HAULING WAGON
Thomas Lee Richard Hardwick, Leawood, Kans.
(4001 E. 137th St. Terrace, Grandview, Mo. 64030)
Filed Nov. 22, 1965, Ser. No. 508,930
9 Claims. (Cl. 214—82)

ABSTRACT OF THE DISCLOSURE

This invention discloses a rock wagon which is attached to a gooseneck of a tractor and includes a body portion having side walls with an ejector assembly in said side walls and adapted to be moved longitudinally of the body member, so that when it is loaded the ejector assembly is movable rearwardly through the body to dump the material from the wagon. The invention is also adapted to be used on a truck or four-wheeled vehicle other than by a gooseneck tractor. The tail gate is particularly constructed in a manner wherein it extends at an angle rearwardly and upwardly of the body at the lower edge thereof and is hingedly connected thereto and has means at the top edge engaging with means on the side walls to hold the side walls from being distorted under load. It further includes hydraulic cylinders movable with the ejector assembly, and the piston rod being attached to the side walls for movement of the ejector assembly longitudinally of the body. The gooseneck is adapted to be removably attached to the inside side walls of the body member, the body member being normally open at the forward and rear ends.

---

This invention relates to an ejector-type load hauling wagon, and more particularly to such a wagon having its front end supported from the gooseneck of a tractor and having means movable from the front to the rear of the load hauling body for ejecting the contents of the body from the rear end thereof.

The present invention is an improvement over Patents No. 2,751,096 and No. 2,876,918.

The principal object of the present invention is to provide a load hauling wagon an open front end adapted to be attached to the transverse tubular draft bar of a gooseneck of a tractor and the wagon having an ejector member movable in the wagon body by hydraulic cylinders movable with said ejector member for moving the dirt out of the open rear end of the wagon body.

Other objects of the present invention are to provide a tailgate for the rear open end of the body whereby when the gate is closed means is provided for engaging the rear ends of the side walls of the body to prevent spreading thereof under load stress; to provide for mounting of the draft bar of the gooseneck of the tractor to the side walls of the forward portion of the body of the wagon so that the body may be easily and quickly assembled and disassembled on the tractor gooseneck structure; to provide the gooseneck mounting with means which permits fast interchangeability for scrapers or other draft implements; to provide such gooseneck mounting for supporting the side walls of the wagon against lateral deflection at the front end thereof; and to provide a gooseneck structure for supporting weight of the wagon in torsion to eliminate reliance on the tower portion of the gooseneck to support such weight.

Other objects of the present invention are to provide mounting of the cylinders on each side of the wagon side walls inside a housing to prevent damage to said cylinders and providing connection of such cylinders with the ejector plate structure so that the cylinders will move therewith upon movement of the pistons in such cylinders by hydraulic means; to provide for mounting of one end of the piston rod of the cylinders to the side walls of the body near the front end thereof; to provide the fluid for the hydraulic means from a source of supply carried by the tractor; and to provide for movement of the ejector assembly on the top rail of the body side walls through roller means on top thereof and at the side as well as at the bottom to hold the ejector mechanism in aligned relation on the body side members and prevent pivoting thereof.

Still further objects of the present invention are to provide mounting of the cylinders in housings movable with the cylinder wherein the rear end of the cylinder is held for longitudinal forces application and the ram end of the body is retained in a block member lined with rubber or similar resilient material which moves with the ejector plate and prevents sag and whip of the cylinder; to provide a two-stage internal acting cylinder for movement of the ejector plate in said body; to provide hydraulic means for opening and closing the tailgate; and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a side view of the load hauling wagon with the ejector plate in forward position.

FIG. 2 is a longitudinal cross-sectional view, particularly illustrating the ejector plate partially moved towards the rear of the wagon body and with the ejector plate shown in dotted lines in both forward and rear positions.

FIG. 3 is an enlarged longitudinal cross-sectional view showing the mounting of the cylinders in the housings.

FIG. 4 is a cross-sectional view of the wagon taken on a line 4—4, FIG. 2.

FIG. 5 is a rear view of the wagon with the tailgate in open position.

FIG. 6 is an enlarged fragmentary cross-sectional view of the mounting of the side walls of the tubular draft bar member of the gooseneck to the front end side walls of the wagon.

FIG. 7 is an enlarged fragmentary view taken on a line 7—7, FIG. 2, particularly illustrating the rear end of one of the side walls of the body and the block on the end gate engaging the outside of such side wall to hold the side walls from spreading under load stress.

FIG. 8 is an enlarged fragmentary view of a side wall of the body and ejector assembly showing the rollers for mounting the ejector assembly for movement on said side wall.

FIG. 9 is an enlarged fragmentary view showing a portion of the ejector assembly and its side wall mounting on the top rail of the walls of the body of the wagon.

Referring more in detail to the drawings:

1 designates a load hauling wagon embodying the features of my invention, and which is particularly adaptable for hauling of rock, dirt and other material. The wagon will more oftenly be referred to as a "rock wagon." The wagon includes a body 2 having an elongated flat bottom 3 having upstanding side walls 4 and 5 which extend rearwardly beyond the bottom 3 for some distance and whose lower edges extend at an upward acute angle as shown at 6 (FIG. 2). Spaced some distance upwardly from the bottom, the side walls 4 and 5 flare outwardly from end to end to the top 7 as shown at 8 (FIG. 9).

The exemplary embodiment of my invention is shown herein for illustrative purposes as a load hauling wagon or vehicle of the trailer type wherein the trailer body 2 is supported by wheels 10 from an axle 11 at the rear end of the body, and the front end of the body is connected to a tractor 12 having wheels 13 and a gooseneck 14 carried by the tractor including a transversely extending torsion draft bar 15 secured to the front end of the side walls of the body 2 of the wagon. The tractor 12 is here shown of the two-wheeled type having a prime mover enclosed in the housing 16, the tractor being connected to the gooseneck supporting and connecting structure 14 through a coupling structure 17 embodying swivel connections which provide for rocking, tilting and turning movements of the tractor relative to the trailer in operation as is the usual practice. Other types of tractors having more wheels may be used.

Steering of the wagon or vehicle is effected through the operation of rams 18 on opposite sides of the gooseneck structure and extending angularly between that structure and the coupling structure 17. A supply of fluid is provided from the tractor under pressure through lines 18′ and 18″ for actuation of the rams 18 (FIG. 1) and other hydraulically operated parts of the vehicle as hereinafter shown.

The side walls 4 and 5 of the body 2 extend forwardly of the bottom as indicated at 19 (FIG. 1) and are angled upwardly as indicated at 20 and as illustrated in FIGS. 4 and 6, and comprise spaced plates 21 and 22 for rigidity of the side walls and for removably attaching the transverse tubular bar 15 thereto. The plates 21 and 22 of the side members 4 and 5 are provided with circular openings 23 and 24. The torsion draft bar 15 has each end flanged as indicated at 25 (FIG. 6) and provided with spaced openings 26. The flanges abut against the inner plates 22 of the side walls 4 and 5 of the body as illustrated in FIG. 4 and the plates 21 and 22 are provided with spaced openings 27 aligning with the openings 26 in the flanges on the respective ends of the draft bar 15 and are secured to the inside of the walls of the front ends of the wagon body by bolts 28. The circular openings 23 and 24 in the side walls are provided with short tubular members 29 and 30 by welding or other suitable means and are closed by removable plates 31 and 32 to provide easy access to the tubular draft bar as will later be shown. This particular mounting of the gooseneck draft bar provides easy interchangeability for a scraper or other draft implement, and in addition to supporting the side walls against outward deflection at the front end thereof due to heavy loads. The particular draft bar arrangement supports the front weight of the wagon in torsion and eliminates reliance on the tower portion of the gooseneck as is usual in ordinary connections with scrapers and other equipment.

The body 2 has an open front end 40 and an open rear end 41, the rear end being closable by a tailgate 42 hingedly connected to the rear end portion 43 by a hinged member 44 extending transversely of the body 2. At substantially the center of the tailgate 43 is an arm 45 to which is pivotally attached one end of a piston rod 46, the other end of which extends into a cylinder 47. The rear end of the cylinder 47 is pivotally attached as at 48 to a depending bracket 49 secured to the bottom 3 of the body as illustrated in FIG. 2 and at substantially the center thereof and is also illustrated in FIG. 4. Fluid from the tractor is supplied to the cylinder by lines 50 and 51 for operation of the cylinder to open and close the tailgate 42.

52 designates generally the ejector assembly comprising a plate 53 having spaced strengthening ribs 53′ which closes the open front end 40 of the body when the wagon is in dirt loading position. The lower portion of the ejector plate 53 fits within the vertical portion of the walls 4 and 5 and then flares outwardly at an angle substantially the same as the outwardly flared side wall portion 8 of the body as illustrated in FIGS. 5 and 9. More particularly, the ejector plate 53 is angled slightly upwardly and forwardly toward the tractor as illustrated in FIG. 2 until it reaches the top rail 54 and then takes a greater angle forwardly as indicated at 55 and then a greater angle forwardly as indicated at 56 (FIG. 2) so as to extend over the upper portion or tower of the gooseneck of the tractor as illustrated in FIG. 1. In order to accommodate for the tower 57 of the gooseneck structure, the upper center portion of the ejector plate is provided with a recessed portion 58 which is provided by a cut out portion 59 and having inset walls 60 and a top member 61 as illustrated in FIGS. 2 and 4.

The ejector assembly includes side walls 62 having channel members 63 extending parallel to and adjacent the top rail 54 of the side walls of the body with an inwardly and downwardly flared portion 64 positioned slightly below the top rail 54. Rigid or brace members 65 are welded or otherwise suitably secured to the rear face 66 of the ejector plate and to the flared portions 62 of the side walls. A plurality of horizontal axis rollers 67 are mounted within the channel 63 on each side of the ejector assembly, the rollers being adapted to engage and roll upon the rail 54 of the side walls.

Welded or otherwise rigidly secured to the outer plate 68 of the channel member 63 is a housing 69 having a top plate 70, a vertical outer side wall 71, a bottom 72 and an inner wall 73 spaced from and extending parallel with the outer side wall 71. The bottom 72 and an intermediate horizontal wall 72′ in the housing 69 form support members for a plurality of vertical axis rollers 74 engaging the side plate 75 of the outwardly flared side wall portion of the side walls of the body. A partition member 75′ is provided in the housing 69 to enclose the rollers 74. Downwardly extending brackets 76 are provided for mounting of horizontal axis rollers 77 engaging a rail 78 formed by the bottom wall of the offset portion of the laterally flared upper wall of the body member, also as illustrated in FIG. 8. The mounting of the horizontal axis and vertical axis rollers will maintain alignment of the ejector assembly on the side walls and prevent pivoting or tipping of the assembly as it moves forwardly and rearwardly of the body of the wagon.

The housing 69 just above described also forms a housing for the horizontal extension members 80 and 81 for movement of the ejector assembly forwardly and rearwardly of the body and the housing and extension members are best illustrated in FIG. 3. The extension members include hydraulic cylinders 82 having an eye 83 at one end having an opening 84 for a pin 85 welded or otherwise secured in the housing as indicated at 86 (FIG. 8). The eye 83 has flat sides and extends between spaced pins 87 and 88 rigidly mounted to the side walls 71 and inner side wall 73 of the housing 69 holding the end 89 of the cylinders in position in the housing. Other connections, such as ball joints, may be used. The housings as illustrated in FIG. 3 have closed ends 90 and 91 with an opening 92 for the ram end 93 of the cylinders. The end 93 of the cylinders are resiliently mounted in the housing by blocks 94 having an opening 95 with a resilient ring member 96, such as rubber or the like, therein so as to prevent sagging or swaying of the cylinder in the housing. However, a yoke and trunnion members may be utilized for this purpose.

I preferably use two-stage internal acting cylinders which include a piston rod 97 universally pivotally mounted by ball joint 98 to a bracket 99 (FIG. 1) on the upper side portions 100 of the forwardly extending portions 19 of the side walls of the body of the wagon as illustrated in FIG. 1. Fluid is supplied from the tractor through lines 101 and 102, and it will thus be seen that since the housing 69 is rigidly secured to the ejector assembly, it will move therewith and the cylinder body will also move with the ejector assembly, the rear end of the cylinder being pinned for longitudinal force application and the ram end of the cylindrical body in the rubber lined blocks also moves with the ejector assembly. It will also be seen by the angle portion of the forward side walls, as indicated at 20 (FIG. 1), turning of the tractor with respect to the wagon gives a greater degree of movement than is found with the usual dump wagon of this character.

The side walls 71 of the housing 69 are provided with holes or openings and covered with plates as is indicated at 103 and 104 (FIG. 1) so that access may be had to the cylinders when desired and for assembly and disassembly thereof.

As herein above mentioned, the side walls of the body extend rearwardly from the rear end of the bottom 3 as best illustrated in FIG. 2 and at an angle upwardly and rearwardly. The tailgate 42 extends at an angle downwardly so that the material in the body will pass thereover to dump the material rearwardly of the wheels 10 of the wagon. The gate when closed forms a part of the bed due to the angle mounting thereof as shown in dotted lines in FIG. 2. When the tailgate drops part of the load is dumped so the stroke of the cylinder or hydraulic extension members 80 and 81 is shortened. There is an advantage in having a shorter wheel base and automatic partial dump as has been here shown and illustrated. There is about a 45° angle from the horizontal position and when it is closed, as shown in dotted lines in FIG. 2, and approximately 130° movement of the tailgate from the open to the closed position.

In order to add strength to the rear ends of the side walls of the body, I provide a bar 105 extending laterally of the outer edge gate 42 having outwardly extending ends 105 and 105' thereon and mounted thereon are locking blocks 107 and 108 which are substantially triangle shape having angled surfaces 109 and 110 facing each other. The rear ends 111 and 112 of the outwardly flared side walls 8 are provided on their outside adjacent the vertical portions 4 and 5 of the side walls with pads or blocks 113 and 114. When the tailgate is raised, the angled faces 109 and 110 of the locking blocks 107 and 108 engage against the outside portions of the pads 113 and 114 as shown in dotted lines in FIG. 2 and as also illustrated in FIG. 7, thus preventing spreading of the side walls during stress of load therein, and particularly when a load of material is dumped into the wagon body. Through control of the hydraulic cylinder 47 the gate is held in closed position and may be opened as desired by the operator of the tractor.

The tubular draft bar 15 is provided at substantially the center thereof with openings 115 and 116. A tubular member 117 is sleeved thereover having openings 118 aligning with the openings 115 and 116. The tubular member is welded to the draft bar to add rigidity to the structure. The openings 115 and 116 provide for running of the fluid lines therethrough from the tractor. For instance, the fluid lines 50 and 51 extend from the tractor down underneath the front ends thereof and may pass through a tubular protection member 119 secured to a keeper member 120 on one of a plurality of ribs or rigid members 121 spaced along the bottom 3 of the body as illustrated in FIG. 2. Lines 122 and 123 extend from the tractor into the opening 115 in the draft bar 15 and then outwardly through openings 124 to the respective cylinders or rams 80 and 81 as illustrated in dotted lines in FIG. 2 for movement of the ejection assembly forwardly and rearwardly in the body of the wagon as herein previously described.

The side walls 4 and 5 of the body on the outside thereof are provided with a plurality of stiffening ribs 127 as illustrated in FIG. 8 and the under or rear face of the tailgate 42 is also provided with ribs 127'. The face 130 of the ejection plate is also provided with spaced ribs or stiffening members as indicated at 131 as well as the outer surfaces of the outwardly flared portion 9 of the side walls of the body member.

In operation of the apparatus assembled as described, by control of the hydraulic cylinders 80 and 81 the ejector assembly may be moved forwardly in the body of the truck (as shown in dotted lines, FIG. 2, or also as shown in FIG. 1) through connection of the cylinders to the housing 69 which, in turn, are rigidly connected to the ejector assembly through the channel members 63.

Through extension of hydraulic cylinder 47, the tailgate 42 may be moved to locked position as shown in dotted lines, FIG. 2, or also as shown in FIG. 1. The wagon is then ready for loading and is loaded with rock, dirt or other material either by hand or by dirt loading equipment (not shown). When the body of the wagon is loaded, it may be transported by the tractor to a place of dumping, and by manipulation of the controls for hydraulic cylinder 47 the tailgate 42 is opened and part of the load dumped thereupon. Manipulation of the controls for hydraulic cylinders 80 and 81 will then move the ejector assembly 52 rearwardly in the body and thereby push the dirt, rock or other material off the bottom and side walls through the open rear end thereof.

It will be obvious from the foregoing that I have provided an improved apparatus and means for detachably mounting the front end of a rock wagon or the like to a torsion draft bar of a gooseneck structure of a tractor. I have also provided novel means of mounting the hydraulic extension members or rams on the rail of the body member of the wagon, whereby the ejection assembly is mounted to prevent tilting or pivoting on the body member and to maintain the same in alignment with the body and wherein the cylindrical portion of the extension member is housed so as to prevent damage thereof and wherein it moves with the ejection assembly. I have also provided a novel means of stiffening the rear walls of the body of the wagon by the tailgate structure and wherein the hydraulic mechanism for raising and lowering the tailgate also holds the tailgate in closed position.

It is to be understood that while I have illustrated and described one form of my invention, it is not to be limited to the specific form or arrangement of parts herein described and shown except insofar as such limitations are included in the claims.

It will be obvious the fluid supply for the hydraulic rams or cylinders may be supplied from a source other than the tractor, such as a pump and tank carried by the wagon, or even other means.

It will also be obvious from the foregoing that the tailgate may be operated independently of the ejector assembly. This becomes important if only a part of a load is desired to be dumped in one spot and the balance in another. The tailgate can be raised without moving the ejector assembly forwardly in the body. It will further be obvious that the wagon body with the ejector mechanism can be mounted directly upon a truck body instead of having the front end supported from the gooseneck of a tractor.

What I claim and desire to secure by Letters Patent is:

1. In combination with a load hauling vehicle having a body with an open top, spaced side walls, a bottom and an open front end, a tractor having a gooseneck structure including a transversely extending draft bar carried by said gooseneck of a length substantially the same as the width of the inside of said side walls of said body, and means securing the ends of said draft bar to the inside of the front open end of said side walls of said body to prevent lateral displacement thereof, said last named means including flange means for detachably securing said draft bar to said side walls.

2. The combination of claim 1 wherein said draft bar is tubular and said detachable means includes laterally directed flanges on the ends of the draft bar to fit within the inside of said side walls, said flanges having spaced openings therein, said side walls having openings aligning with the openings in said flanges, and bolts engaging in said openings for securing said flanges to said side walls.

3. In an ejector type load hauling wagon having a body with an open top, spaced side walls having top rails and rear edge portions, a bottom and open front and rear ends, a tractor having a gooseneck structure including a transversely extending draft bar carried by said gooseneck of a length substantially the same as the width of the inside of said side walls of said body, and means detachably securing the ends of said draft bar to the inside of the front open end of said side walls of said body to prevent lateral displacement thereof, the combination of an ejector assembly including side channel members movable longitudinally of the top rails on the body side walls and a pusher plate extending into the body in closely spaced relationship to the side walls and bottom, said pusher plate having a normal position at the front of the body, means supporting the ejector assembly on the body for movements longitudinally thereof, housings extending alongside said channel members and rigidly secured thereto, hydraulic cylinders mounted in said housings and movable therewith, said cylinders having pistons and rods, means mounting the free ends of the rods on the outside near the front end of said side walls, fluid supply means for said cylinders for effecting longitudinal movements of said ejector assembly relative to the body, and a tailgate normally closing the rear end of the body and having a normally lower end, means hinging the tailgate at said normally lower end on the rear end of the body for downward swinging movement from a closed position, structural means on the tailgate normally spaced above said normally lower end and having portions extending outwardly of the side edges of the end gate, pad members on said side walls of the body near the rear ends thereof, and block members on said outwardly extending portions of the structural means on said end gate, said block members having angle faces adapted to engage said pad members to prevent lateral displacement of the side walls when said tailgate is closed and under load stress.

4. In a rear dump wagon which comprises a wagon body having a bottom and upstanding side walls and an open rear end, the combination of a tailgate normally closing the rear end of the body, means hinging the tailgate at its normally lower end on the rear end of the body for downward swinging movement from a closed position, means for selectively urging said tailgate into said closed position, wedge members having normally forwardly and outwardly sloping surfaces on said tailgate and spaced upwardly from said normally lower end, wedge means on said side walls at the rear thereof, said wedge members being adapted to engage said side wall wedge means when the tailgate is closed to urge said side walls toward each other into a predetermined relation and to prevent spread of said side walls under stress of load in said body.

5. The rear dump wagon as set forth in claim 4 wherein said wedge members on said tailgate are mounted on blocks secured adjacent side edges of said tailgate and said wedge means on said side walls are mounted on the outer sides of said side walls adjacent the rear edges thereof.

6. The vehicle as set forth in claim 4 wherein said means for selectively urging said tailgate into closed position includes a bracket arm at substantially the center of the outside of the tailgate, a bracket depending from the bottom of said body at substantially the transverse center and forwardly of said rear end of said body, and an hydraulic cylinder including a piston and rod, said rod being pivotally connected to said bracket arm and said cylinder being connected to said depending bracket, and fluid supply means for operating said cylinder.

7. The vehicle as set forth in claim 4 wherein said tailgate, when closed, slopes upwardly and rearwardly from said normally lower edge.

8. In an ejector type load hauling vehicle, the combination comprising a body open at the top and having side walls having front and rear ends and a bottom, said side walls having a top forming rails thereon, an ejector assembly including side channel members movable longitudinally of the rails on the body side walls and a pusher plate extending into the body in closely spaced relationship to the side walls and bottom, said pusher plate having a normal position at the front of the body, rollers mounted on said side channel members and engaging said rails for supporting the ejector assembly on the body for movements longitudinally thereof, elongated housings extending alongside said channel members and rigidly secured thereto, elongated hydraulic cylinders having front and rear ends and mounted at both of said ends in said housings and movable therewith, said cylinders having extensible rods with free ends connected to said side walls near the front ends thereof, and fluid supply means for said cylinders for effecting longitudinal movements of said ejector assembly relative to the body.

9. The combination of claim 8 wherein said cylinder front end mounting includes a resilient member resiliently supporting said cylinder front end against sagging between said cylinder rear end said rod free end.

References Cited
UNITED STATES PATENTS

| | | | |
|---|---|---|---|
| 691,031 | 1/1902 | Wheatley et al. | 296—517 |
| 2,179,726 | 11/1939 | Lewis et al. | 214—82 |
| 2,751,096 | 6/1956 | Darkenwald | 214—82 |
| 2,876,918 | 3/1959 | Kling | 214—82 |

ROBERT G. SHERIDAN, *Primary Examiner.*